(12) United States Patent
Olney et al.

(10) Patent No.: US 7,380,862 B2
(45) Date of Patent: Jun. 3, 2008

(54) SEALING DEVICE ESPECIALLY FOR SEALING THE FOLDING ROOF OF A CAR

(75) Inventors: Peter Olney, Worthing (GB); Evelyn Lerbs, Sigmarszell (DE); Jorg Fessler, Tettnang (DE); Uwe Brinkmann, Nonnenhorn (DE); Armin Klockenhoff, Langenargen (DE)

(73) Assignee: Metzeler Automotive Profile Systems GmbH, Lindau/Bodenesee (DE)

( * ) Notice: Subject to any disclaimer, the term of this patent is extended or adjusted under 35 U.S.C. 154(b) by 311 days.

(21) Appl. No.: 10/531,624

(22) PCT Filed: Oct. 9, 2003

(86) PCT No.: PCT/EP03/11209

§ 371 (c)(1),
(2), (4) Date: Oct. 24, 2005

(87) PCT Pub. No.: WO2004/035340

PCT Pub. Date: Apr. 29, 2004

(65) Prior Publication Data

US 2006/0097541 A1    May 11, 2006

(30) Foreign Application Priority Data

Oct. 14, 2002  (DE)  ................. 102 47 756

(51) Int. Cl.
*E06B 7/16* (2006.01)

(52) U.S. Cl. ................ 296/107.04; 49/475.1; 49/495.1

(58) Field of Classification Search .................. 296/93, 296/107.04, 135, 146.3, 146.7, 107.4; 49/484.1, 49/495.1, 498.1, 475.1
See application file for complete search history.

(56) References Cited

U.S. PATENT DOCUMENTS

| 4,510,664 | A |   | 4/1985 | Lock |
| 5,950,366 | A | * | 9/1999 | Uhlmeyer .................. 49/484.1 |

FOREIGN PATENT DOCUMENTS

| DE | 2 127 097    | 12/1972 |
| DE | 82 05 150 U1 | 5/1984  |
| DE | 3 801 073 A1 | 10/1988 |
| EP | 0 285 925 B2 | 10/1988 |

* cited by examiner

*Primary Examiner*—Lori L Lyjak
(74) *Attorney, Agent, or Firm*—Stephen B. Salai; Brian B. Shaw; Harter Secrest & Emery LLP

(57) ABSTRACT

The invention relates to a weatherstrip assembly which is used particularly for sealing a folding hardtop (10) of a motor vehicle and comprises a joint consisting of sealing section (21) and fastening section (22) parts. The sealing section (21) is provided with a sealing lip (23), which is made of elastically deformable material, can be moved from the first position (I) to the second position (II) thereof and is provided with at least one restoring element (40). In order to ensure a durable, efficient and reliable restoring response of the sealing lip (23), it is provided with a tensioning element (50) in the form of a hose on the end thereof.

15 Claims, 2 Drawing Sheets

SEALING DEVICE ESPECIALLY FOR SEALING THE FOLDING ROOF OF A CAR

FIELD OF THE INVENTION

The invention relates to a weatherstrip assembly, particularly for sealing a folding hardtop of a motor vehicle. The weatherstrip assembly is provided with a seal comprising a sealing section and a fastening section. The sealing section comprises a sealing lip made of an elastomer, which is pivotable from a first position into a second position and provided with at least one springy restoring element.

BACKGROUND ART

Open top automobiles are now being fitted increasingly with a folding hardtop instead of a convertible soft top. The folding hardtop comprises as a rule a plurality of rigid roof parts each pivotable relative to the other to retract or extend the folding hardtop. Because of the rigid roof parts the folding hardtop when extended offers the vehicle occupants almost the same comfort as a regular hardtop.

Since the roof parts are pivoted relative to each other a seal is needed which in the extended condition of the roof satisfactorily drains off any water having collected on the roof parts when retracting the roof, otherwise there would be a risk of the water gaining access to the vehicle interior when pivoting the roof parts. To achieve a satisfactory seal it may be necessary that a sealing lip of a seal, arranged between the roof parts is squashed in the extended condition of the roof, to automatically right itself to its normal condition when the roof is retracted. This restoring response is influenced by the nature of the material from which the sealing lip is made. Conventional sealing lips are usually made of an elastomeric material which although having a comparatively high elastomeric response, results in a loss of springiness with dynamic loading in the long run, to the detriment of its restoring response.

This is why it is known from prior art to strengthen a sealing lip with a bracing element for satisfactory self-righting of the sealing lip. Thus, EP 0 285 925 B2 describes a seal made of an elastomeric material featuring a sealing lip for contacting a counter surface to be sealed. Embedded in the sealing lip is a bracing element of spring steel provided with recesses which in the transverse direction of the sealing lip produce areas differing in stiffness. In other words the recesses permit defining conformance of the restoring forces so that a defined restoring materializes when the sealing lip is deflected. Disclosed in addition in DT 2 127 097 is a guide for a window pane comprising sealing lips provided with a bent strip of sheet metal made of stainless spring steel for either clamping or vulcanizing in place to the sealing lips. The strips of sheet metal serve to attain both a satisfactory seal and spring tensioning the window pane in place.

The invention is based on the object of sophisticating a weatherstrip assembly of the aforementioned kind for achieving a satisfactory sealing effect of the sealing lip with a durable restoring response.

To achieve this objective a weatherstrip assembly having the features as cited above is provided in accordance with the invention as it reads from claim 1 such that the sealing lip comprises a free end section provided with a strip-shaped tensioning element.

The weatherstrip assembly in accordance with the invention is characterized by a durable restoring response of the sealing lip. The reason for this is the springy restoring element now achieving a defined restoring force. The restoring force ensures that the sealing lip automatically rights itself from the second position to the first position as soon as the counter-force exerted by a roof part no longer exists, in thus ensuring a satisfactory seal. In addition, the tensioning element provided in the free end section of the sealing lip prevents the sealing lip from deforming to the detriment of the sealing effect exerted by the sealing lip.

Advantageous aspects of the weatherstrip assembly in accordance with the invention read from the subject matter of claims 2 to 15.

Thus, it is of advantage for good practice in fabrication to extrude the sealing section and/or the fastening section in a thermoplastic elastomer (TPE) or ethylene propylene diene monomer (EPDM). Any loss of springiness detrimenting the restoring response of the sealing lip, which might arise in the course of time because of the material, is prevented by the restoring element.

It is furthermore of advantage to connect the tensioning element materially to the end section to ensure a safe fastening. The tensioning element may be, for example, embedded in the end section when extruding the weatherstrip.

In an alternative aspect of the weatherstrip assembly in accordance with the invention the end section may comprise an opening in which the tensioning element is arranged. The tensioning element and the weatherstrip can in this case be fabricated separately and assembled as required. Separate fabrication permits an independent selection of material in thus contributing towards configuring the tensioning element in accordance with the stress involved. For this purpose it has been discovered to be of advantage to fabricate the tensioning element of metal or plastics, preferably of polyamide fibers.

Preferably, the restoring element is connected to the sealing lip positively and/or non-positively in ensuring comparatively cost-effective fabrication.

In another preferred aspect of the weatherstrip assembly in accordance with the invention the sealing lip comprises an outer surface facing a first component and an inner surface opposite the outer surface, the restoring element being secured to the inner surface. Such a configuration is associated with the advantage that when the sealing lip is tensioned by the first component on the outer surface the restoring element arranged at the opposite inner surface is protected by the sealing lip.

To ensure facilitated securement of the restoring element it is of advantage when the sealing lip in the region of the inner surface comprises at least one clamping section for securing the restoring element. The clamping section permits facilitated fitting and removal of the restoring element and thus also contributes towards a design in keeping with recycling requirements.

Preferably the restoring element is made of plastics or metal, preferably spring steel to achieve a springy response by simple ways and means. In the latter case it has been discovered to be expedient to coat the restoring element in protecting it, for instance, from corrosion or other ambient effects.

In another further aspect of the weatherstrip assembly in accordance with the invention the restoring element is configured as a strip extending practically the full length of the sealing lip. Such a configuration allows for a high restoring force whilst ensuring, on the other hand, relatively simple assembly. As an alternative, a plurality of restoring elements may be arranged distributed over the length of the sealing lip. This configuration has the advantage that the restoring force exerted by the restoring elements varies over the length of the sealing lip in thus permitting conforming to the particular application in each case. For this purpose, the restoring elements may be dimensioned, for example, differingly or spaced away from each other differingly. In this case there is the advantage that because of the tensioning element arranged in the end section of the sealing lip deforming of the sealing lip detrimenting a good weatherseal is reliably prevented when the sealing lip is provided with regions of differing restoring force.

To achieve a consistent repetition of the restoring response with simple and cost-effective fabrication, the restoring element is preferably provided with an articulated bend. This articulated bend ensures that the restoring element and thus the sealing lip can be pivoted definedly from the first position into the second position and vice-versa.

In still another preferred aspect of the weatherstrip assembly in accordance with the invention the sealing section comprises an elastomeric hollow chamber which for forming a trough is arranged opposite the inner surface of the sealing lip. The trough formed between the sealing lip and the hollow chamber now makes it possible to satisfactorily drain off any water having collected on the roof parts of the folding hardtop of a motor vehicle when retracting the folding hardtop. The sealing lip and hollow chamber form in the first position of the sealing lip sufficiently high sidewalls ensuring satisfactory guidance of the water flowing through the trough in preventing the water outside of the trough from gaining access to the vehicle interior. To achieve at the same time satisfactory sealing of a component to which the weatherstrip is secured, the hollow chamber is preferably connected to a second sealing lip.

BRIEF DESCRIPTION OF THE DRAWINGS

Details and further advantages of the weatherstrip assembly in accordance with the invention read from the following description of a preferred example embodiment. In the drawings representing the example embodiment merely diagrammatically

DETAILED DESCRIPTION OF THE INVENTION

Figure 1:
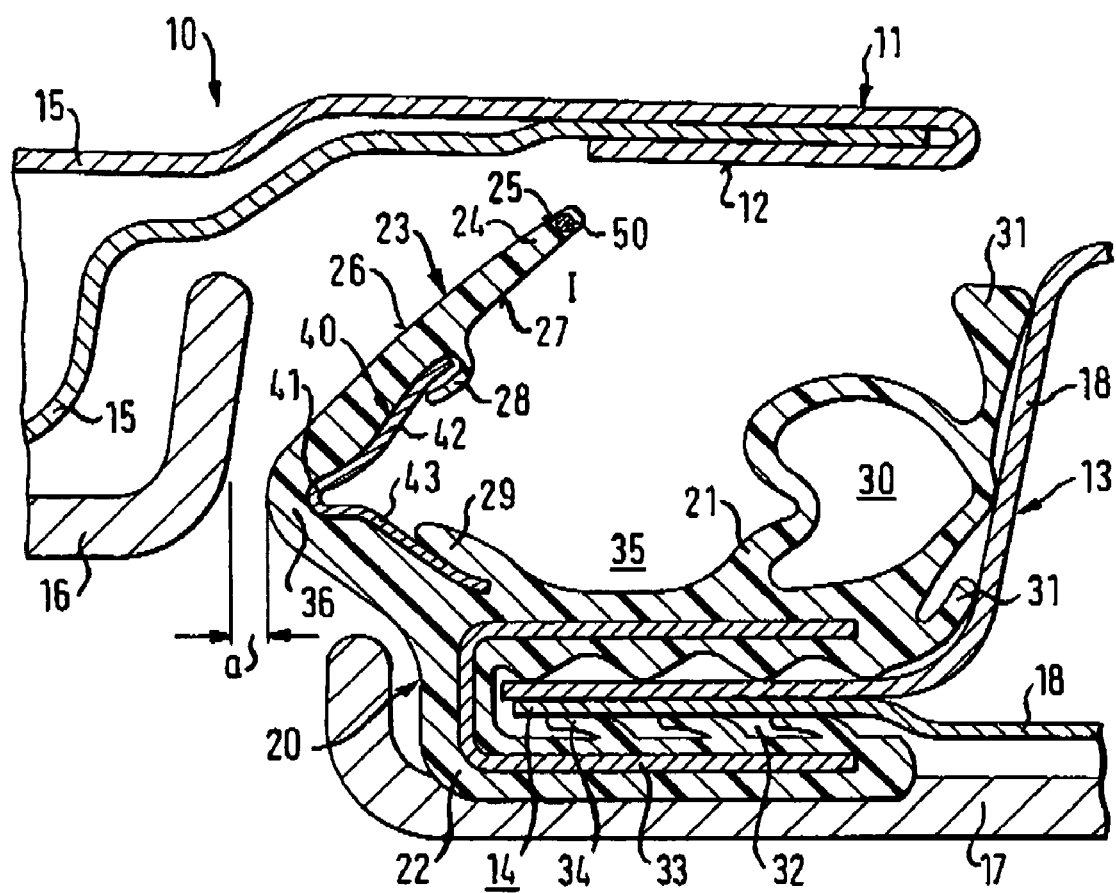
FIG. 1 is a cross-section through a weatherstrip sealing the roof parts each pivotable relative to the other, showing the sealing lip in a first position.
Figure 2:
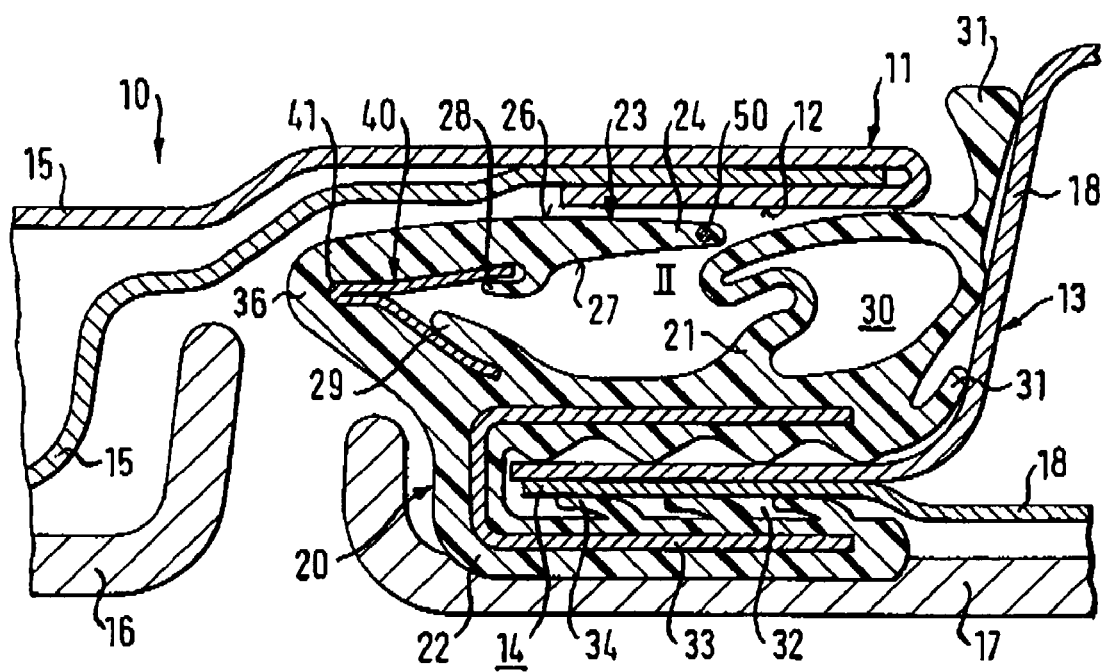
FIG. 2 is a cross-section as shown in FIG. 1 showing the sealing lip in a second position.

The weatherstrip assembly as shown in FIGS. 1 and 2 serves to seal a folding hardtop 10 of a motor vehicle. The folding hardtop 10 comprises at least two rigid roof parts 11, 13 each pivotable relative to the other. The roof part 11 is composed of a several roof panels 15, 16 whereas the roof part 13 comprises several roof panels 17, 18. The roof panels 18 are joined together into a flange 14 to which a weatherstrip 20 extruded in EPDM is secured.

The weatherstrip 20 features a sealing section 21 sealing the roof parts 11, 13 each from the other, and a fastening section 22 which is secured to the flange 14. For this purpose the fastening section 22 is provided with a recess 32 for non-positive engagement of the flange 14. To enhance the non-positive connection the recess 32 comprises a plurality of retaining lips 34 contacting the flange 14. In addition, the recess 32 is surrounded by a reinforcing carrier 33 which strengthens the fastening section 22.

The sealing section 21 comprises an elastomeric hollow chamber 30 which is connected to sealing lips 31 adjoining a roof panel 18. The sealing section 21 is additionally provided with a sealing lip 23 disposed spaced away from the hollow chamber 30. As particular evident from FIG. 1, the hollow chamber 30 and the sealing lip 23 form a trough 35 serving to drain off any water having collected on the roof parts 11,13 when retracting the folding hardtop 10.

The sealing lip 23 comprises an end section 24 provided with an opening 25. Located in the opening 25 is a strip-shaped tensioning element 50. The tensioning element 50 can take the form of a wire, for example, or a cord formed of polyamide fibers inserted in the opening 25. As an alternative the tensioning element 50 can be embedded in the end section 24 when extruding the weatherstrip 20 to thus become materially connected thereto.

Furthermore, the sealing lip 23 comprises an outer surface 26 facing the roof part 11 and opposite thereto an inner surface 27 facing the hollow chamber 30. Secured to the inner surface 27 is a restoring element 40 made of spring steel and coated to protect it from corrosion. For securing the restoring element 40 the sealing lip 23 comprises in the region of the inner surface 27 two clamping sections 28, 29 to which the restoring element 40 is connected positively and non-positively. The restoring element 40 comprises two legs 42, 43 each disposed at an angle to the other and connected to each other by an articulated bend 41. The bend 41 is arranged in the region of a downswept portion 36 of the sealing lip 23 to thus make sure that any restoring force exerted by the restoring element 40 is communicated to the sealing lip 23 when the legs 42 and 43 are squashed.

As evident from FIGS. 1 and 2 the sealing lip 23 is pivotable about an axis running in the region of the downswept portion 36 from a first position I into a second position II and vice-versa. To ensure unobstructed pivoting of the sealing lip 23 a predefined minimum spacing a is provided between the downswept portion 36 and the roof panel 16 opposite the latter, the sealing lip 23 then being pivoted when the roof parts 11,13 are moved relative to the other. A contact surface 12 of the roof part 11 facing the weatherstrip 20 is urged against the sealing lip 23 and the hollow chamber 30 in the extended condition of the folding hardtop 10 to squash the hollow chamber 30 and pivot the sealing lip 23 into the second position II as evident from FIG. 2. On retracting the folding hardtop 10 the hollow chamber 30 re-expands and the sealing lip 23 rights itself into the first position I, as evident from FIG. 1.

The weatherstrip assembly as described above is characterized by a durable restoring response of the sealing lip 23. This is due particular to the springy effect of the restoring element 40 generating a defined restoring force. This restoring force ensures that the sealing lip 23 rights itself into the first position I as soon as the counterforce exerted on the roof parts 11 is cancelled. It is in this way that it is assured that any water having collected on the roof parts 11, 13 is drained off by the trough 35 formed by the sealing lip 23 and the hollow chamber 30.

The restoring force exerted on the sealing lip 23 can be influenced by the location and configuration of the restoring element 40. Because of the clamping sections 28, 29 a plurality of restoring elements 40 can be arranged along the inner surface 27 of the sealing lip 23 by simple ways and means. Where necessary, the restoring elements 40 can be located differingly spaced away from each other to vary the restoring force regionally without detrimenting the sealing effect emanating from the sealing lip 23. This is primarily due to the tensioning element 50 arranged in the end section 24, which prevents the sealing lip 23 from deforming because of the restoring force exerted by the restoring elements 40 as a result of the differences in the force exerted.

The sealing lip 23 provided with the restoring element 40 can be put to use not only for a folding hardtop 10, it also finds application for all purposes necessitating satisfactory pivoting of the sealing lip 23 from a first position I into a second position II and vice-versa. Last but not least, the sealing lip 23 comprising the tensioning element 50 and the restoring element 40 thus lends itself to a universal usage.

What is claimed is:

1. A weatherstrip assembly, particularly for sealing a folding hardtop of a motor vehicle, provided with a weatherstrip comprising a sealing section and a fastening section, said sealing section comprising a sealing lip made of an elastomerically deformable material for pivoting from a first position into a second position and provided with at least one springy restoring element, wherein said sealing lip comprises a free end section provided with a strip-shaped tensioning element.

2. The weatherstrip assembly as set forth in claim 1, wherein at least one of said sealing section and said fastening section are-is extruded from a thermo-plastic elastomer or ethylene propylene diene monomer.

3. The weatherstrip assembly as set forth in claim 1, wherein said tensioning element is materially connected to said end section.

4. The weatherstrip assembly as set forth in claim 1, wherein said end section comprises an opening in which said tensioning element is arranged.

5. The weatherstrip assembly as set forth in claim 1, wherein said tensioning element is made of metal or plastics, preferably of polyamide fibers.

6. The weatherstrip assembly as set forth in claim 1, wherein said restoring element is connected to said sealing lip.

7. The weatherstrip assembly as set forth in claim 1, wherein said sealing lip comprises an outer surface facing a first component and an inner surface opposite said outer surface, said restoring element being secured to said inner surface.

8. The weatherstrip assembly as set forth in claim 7, wherein said sealing lip in the region of said inner surface comprises at least one clamping section for securing said restoring element.

9. The weatherstrip assembly as set forth in claim 1, wherein said restoring element is made of plastics or metal, preferably of spring steel.

10. The weatherstrip assembly as set forth in claim 9, wherein said restoring element is coated with a protective layer.

11. The weatherstrip assembly as set forth in claim 1, wherein said restoring element is configured as a strip extending practically the full length of said sealing lip.

12. The weatherstrip assembly as set forth in claim 1, wherein a plurality of restoring elements is arranged distributed over the length of said sealing lip.

13. The weatherstrip assembly as set forth in claim 1, wherein said restoring element is preferably provided with an articulated bend.

14. The weatherstrip assembly as set forth in claim 1, wherein said sealing section comprises an elastomeric hollow chamber which for forming a trough is arranged opposite said inner surface of said sealing lip.

15. The weatherstrip assembly as set forth in claim 14, wherein said hollow chamber is connected to a second sealing lip.

* * * * *